US010942677B2

(12) United States Patent
Yang et al.

(10) Patent No.: US 10,942,677 B2
(45) Date of Patent: Mar. 9, 2021

(54) METHOD FOR PERFORMING ACCESS MANAGEMENT OF MEMORY DEVICE, ASSOCIATED MEMORY DEVICE AND CONTROLLER THEREOF, ASSOCIATED HOST DEVICE AND ASSOCIATED ELECTRONIC DEVICE

(71) Applicant: Silicon Motion Inc., Hsinchu County (TW)

(72) Inventors: Tsung-Chieh Yang, Hsinchu (TW); Wen-Long Wang, Hsinchu (TW)

(73) Assignee: Silicon Motion, Inc., Hsinchu County (TW)

( * ) Notice: Subject to any disclaimer, the term of this patent is extended or adjusted under 35 U.S.C. 154(b) by 0 days.

(21) Appl. No.: 16/257,022

(22) Filed: Jan. 24, 2019

(65) Prior Publication Data
US 2020/0241795 A1 Jul. 30, 2020

(51) Int. Cl.
*G06F 3/06* (2006.01)
*G06F 12/02* (2006.01)
*G06F 11/34* (2006.01)

(52) U.S. Cl.
CPC .......... *G06F 3/0659* (2013.01); *G06F 3/0611* (2013.01); *G06F 3/0622* (2013.01); *G06F 3/0653* (2013.01); *G06F 3/0679* (2013.01); *G06F 12/0246* (2013.01); *G06F 11/3419* (2013.01)

(58) Field of Classification Search
None
See application file for complete search history.

(56) References Cited

U.S. PATENT DOCUMENTS

| 2010/0169603 | A1* | 7/2010 | Perry | G06F 3/0611 711/167 |
| 2012/0151118 | A1 | 6/2012 | Flynn | |
| 2012/0278819 | A1 | 11/2012 | Cho | |
| 2014/0047210 | A1* | 2/2014 | Cohen | G06F 12/0246 711/202 |
| 2015/0012671 | A1* | 1/2015 | Park | G06F 3/0634 710/5 |
| 2015/0180975 | A1* | 6/2015 | Shibayama | G06F 11/3419 709/213 |
| 2017/0206033 | A1* | 7/2017 | Ma | G06F 12/0246 |
| 2018/0314450 | A1* | 11/2018 | Qiu | G06F 3/061 |

(Continued)

FOREIGN PATENT DOCUMENTS

TW I498733 9/2015

*Primary Examiner* — Sean D Rossiter
*Assistant Examiner* — Stephanie Wu
(74) *Attorney, Agent, or Firm* — Winston Hsu

(57) ABSTRACT

A method for performing access management of a memory device and associated apparatus (e.g. the memory device and controller thereof such as a memory controller within the memory device, an associated host device and an associated electronic device) are provided. The method may include: when the host device sends a host command to the memory device, utilizing the memory controller to estimate a completion time of the host command, to generate completion time information corresponding to the completion time; and utilizing the memory controller to send the completion time information to the host device, to allow the host device to perform polling after the completion time to obtain execution result of the host command.

39 Claims, 6 Drawing Sheets

(56) References Cited

U.S. PATENT DOCUMENTS

2019/0026220 A1* 1/2019 Lee ................ G06F 3/0659
2019/0079697 A1* 3/2019 Suzuki ............. G06F 3/0679
2019/0369919 A1* 12/2019 Hao ................ G06F 3/067

* cited by examiner

METHOD FOR PERFORMING ACCESS MANAGEMENT OF MEMORY DEVICE, ASSOCIATED MEMORY DEVICE AND CONTROLLER THEREOF, ASSOCIATED HOST DEVICE AND ASSOCIATED ELECTRONIC DEVICE

BACKGROUND OF THE INVENTION

1. Field of the Invention

The present invention relates to access control of flash memory, and more particularly, to a method for performing access management of a memory device, and associated apparatus (e.g. the memory device and controller thereof such as a memory controller within the memory device, an associated host device and an associated electronic device).

2. Description of the Prior Art

Developments in memory technology have led to the wide application of portable or non-portable memory devices, such as memory cards which conform to the SD/MMC, CF, MS and XD specifications, respectively, solid state drives (SSDs), or embedded memory devices which conform to the UFS and eMMC specifications, respectively. Improving access control of memories in these memory devices remains an issue to be solved in the art.

NAND flash memories may comprise single level cell (SLC) and multiple level cell (MLC) flash memories. In an SLC flash memory, each transistor used as a memory cell may have any of two electrical charge values, respectively representing the logic values 0 and 1. The storage ability of each transistor used as a memory cell in an MLC flash memory may be fully utilized, where the transistor may be driven by a voltage higher than that in the SLC flash memory, and different voltage levels can be utilized to record information of at least two bits (e.g. 00, 01, 11, or 10). In theory, the recording density of the MLC flash memory may reach at least twice the recording density of the SLC flash memory, and is therefore preferred by manufacturers of NAND flash memories.

Compared with the SLC flash memory, the lower cost and larger capacity of the MLC flash memory means it is more likely to be applied in memory devices. The MLC flash memory does have instability issues, however. To ensure that access control of the flash memory in the memory device meets related specifications, a controller of the flash memory is usually configured to have management mechanisms to properly manage the access of data.

Related art memory devices with the above management mechanisms still have some disadvantages. For example, utilizing newer architecture of transmission interface, such as that conforming to Peripheral Component Interconnect Express (PCIe) specification, may increase transmission bandwidth between a memory device and a host device. In order to fully utilize the transmission bandwidth and obtain an access result as soon as possible, it is suggested in the related art that the host device should operate in certain operation mode and perform continuously polling, typically causing hardware resource full-load/overload (e.g. high usage such as 100%) of the host device. Thus, a novel method and associated architecture are needed for enhancing overall performance without introducing any side effect or in a way that is less likely to introduce a side effect.

SUMMARY OF THE INVENTION

It is an objective of the present invention to provide a method for performing access management of a memory device, and associated apparatus (e.g. the memory device and controller thereof such as a memory controller within the memory device, an associated host device and an associated electronic device), in order to solve the above problems.

It is another objective of the present invention to provide a method for performing access management of a memory device, and associated apparatus (e.g. the memory device and controller thereof such as a memory controller within the memory device, an associated host device and an associated electronic device), in order to enhance overall performance without introducing any side effect or in a way that is less likely to introduce a side effect.

At least one embodiment of the present invention provides a method for performing access management of a memory device. The memory device may comprise a non-volatile (NV) memory and a memory controller for controlling the accessing of the NV memory, and the NV memory may comprise at least one NV memory element (e.g. one or more NV memory elements). The method may comprise: if the host device sends a host command to the memory device, utilizing the memory controller to estimate a completion time of the host command, to generate completion time information corresponding to the completion time; and utilizing the memory controller to send the completion time information to the host device, to allow the host device to perform polling after the completion time to obtain an execution result of the host command.

In addition to the above method, the present invention also provides a memory device, and the memory device comprises a NV memory and a controller. The NV memory is arranged to store information, wherein the NV memory may comprise at least one NV memory element (e.g. one or more NV memory elements). The controller is coupled to the NV memory, and the controller is arranged to control operations of the memory device. In addition, the controller comprises a processing circuit that is arranged to control the controller according to a plurality of host commands from a host device to allow the host device to access the NV memory through the controller. For example, if the host device sends a host command to the memory device, the controller estimates a completion time of the host command, to generate completion time information corresponding to the completion time. Additionally, the controller sends the completion time information to the host device, to allow the host device to perform polling after the completion time to obtain an execution result of the host command.

According to some embodiments, an associated electronic device is also provided. The electronic device may comprise the above memory device, and may further comprise: the host device, coupled to the memory device. The host device may comprise: at least one processor, arranged for controlling operations of the host device; and a power supply circuit, coupled to the at least one processor, arranged for providing power to the at least one processor and the memory device. In addition, the memory device may provide the host device with storage space.

In addition to the above method, the present invention also provides a controller of a memory device, where the memory device comprises the controller and a NV memory. The NV memory may comprise at least one NV memory element (e.g. one or more NV memory elements). In addition, the controller comprises a processing circuit that is arranged to control the controller according to a plurality of host commands from a host device, to allow the host device to access the NV memory through the controller. For example, if the host device sends a host command to the memory device, the controller estimates a completion time of the host command, to generate completion time information corresponding to the completion time. Additionally, the controller sends the completion time information to the host device, to allow the host device to perform polling after the completion time to obtain an execution result of the host command.

At least one embodiment of the present invention provides a method for performing access management of a memory device. The memory device may comprise a NV memory and a memory controller for controlling the accessing of the NV memory, and the NV memory may comprise at least one NV memory element (e.g. one or more NV memory elements). The method may comprise: controlling a host device to send a host command to the memory device, and to utilize the memory controller to estimate a completion time of the host command, to generate completion time information corresponding to the completion time; and according to the completion time information sent from the memory controller, controlling the host device to perform polling after the completion time to obtain an execution result of the host command.

At least one embodiment of the present invention provides a host device, and the host device comprises at least one processor that is arranged to control operations of the host device, and perform access management of a memory device, wherein the memory device comprises a NV memory and a memory controller for controlling the accessing of the NV memory, and the NV memory comprises at least one NV memory element. The at least one processor controls the host device to send a host command to the memory device, and to utilize the memory controller to estimate a completion time of the host command, to generate completion time information corresponding to the completion time. According to the completion time information sent from the memory controller, the at least one processor controls the host device to perform polling after the completion time to obtain an execution result of the host command. For example, the host device may further comprise a power supply circuit that is coupled to the at least one processor and is arranged to provide power to the at least one processor and the memory device, wherein the memory device provides the host device with storage space.

The present invention method and associated apparatus can guarantee that the whole system (e.g. the host device and the memory device) can operate properly, to prevent problems in the related art, such as hardware resource full-load/overload. In addition, implementing according to the embodiments of the present invention does not significantly increase additional costs. Therefore, the related art problems can be solved, and the overall cost will not increase too much. In comparison with the related art, the present invention method and associated apparatus can enhance overall performance without introducing any side effect or in a way that is less likely to introduce a side effect.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
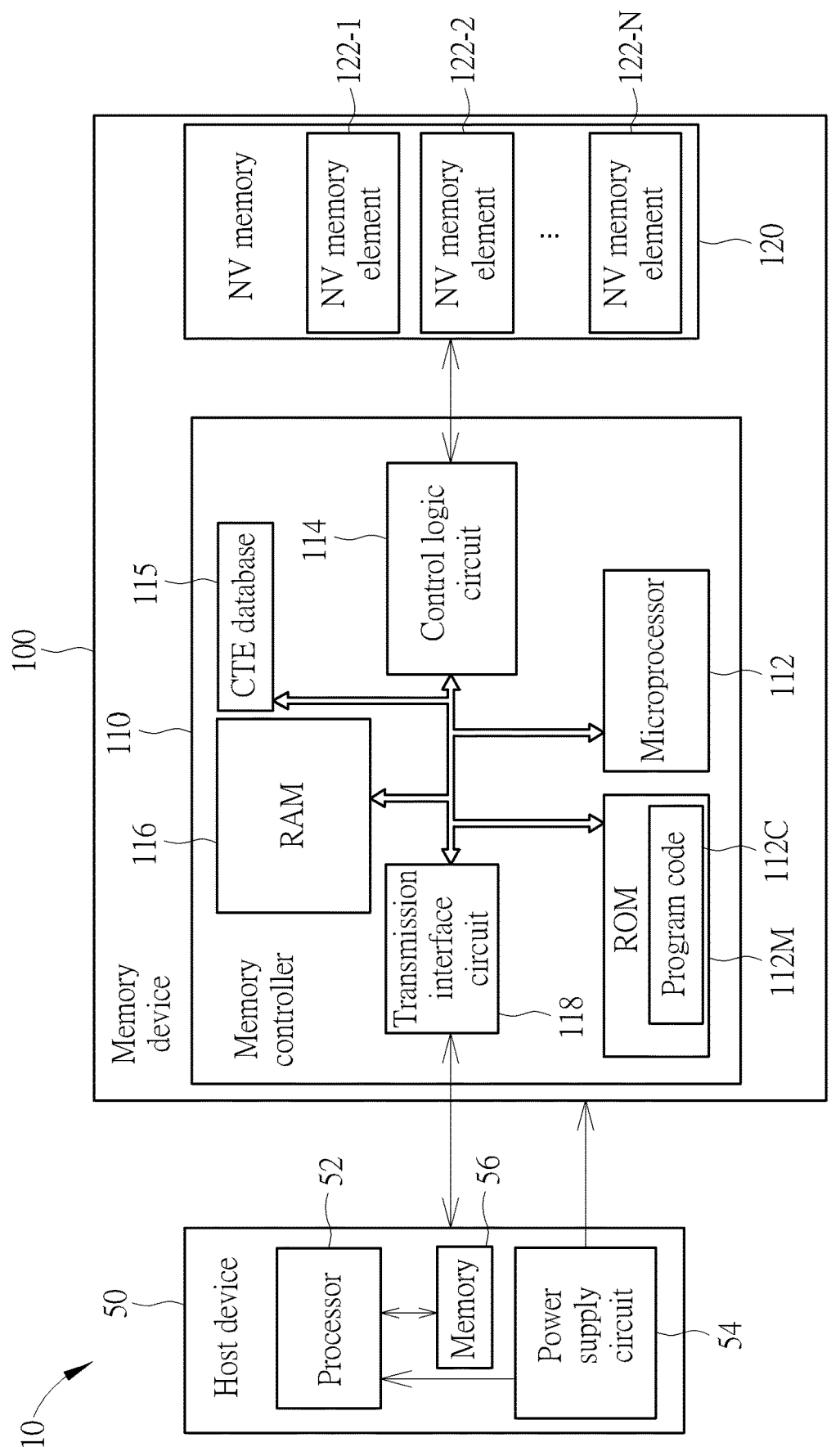
FIG. 1 is a diagram of an electronic device according to an embodiment of the present invention.

FIG. 1 is a diagram of an electronic device 10 according to an embodiment of the present invention, where the electronic device 10 may comprise a host device 50 and a memory device 100. The host device 50 may comprise at least one processor (e.g. one or more processors) which may be collectively referred to as the processor 52, and may further comprise a power supply circuit 54 and a memory 56 that are coupled to the processor 52, respectively. The processor 52 is arranged for controlling operations of the host device 50, and the power supply circuit 54 is arranged for providing power to the processor 52 and the memory device 100, and outputting one or more driving voltages to the memory device 100. The memory 56 may store information for the host device 50. For example, the memory 56 may be a random access memory (RAM), but the present invention is not limited thereto. The memory device 100 may be arranged for providing the host device 50 with storage space, and obtaining the one or more driving voltages from the host device 50 as power source of the memory device 100. Examples of the host device 50 may include, but are not limited to: a multifunctional mobile phone, a wearable device, a tablet computer, and a personal computer such as a desktop computer and a laptop computer. Examples of the memory device 100 may include, but are not limited to: a solid state drive (SSD), and various types of embedded memory devices such as that conforming to the Peripheral Component Interconnect Express (PCIe) specifications. According to this embodiment, the memory device 100 may comprise a controller such as a memory controller 110, and may further comprise a non-volatile (NV) memory 120, where the controller is arranged to control operations of the memory device 100 and access the NV memory 120, and the NV memory 120 is arranged to store information. The NV memory 120 may comprise at least one NV memory element (e.g. one or more NV memory elements), such as a plurality of NV memory elements 122-1, 122-2, . . . , and 122-N, where "N" may represent a positive integer that is greater than one. For example, the NV memory 120 may be a flash memory, and the plurality of NV memory elements 122-1, 122-2, . . . , and 122-N may be a plurality of flash memory chips or a plurality of flash memory dies, but the present invention is not limited thereto.

As shown in FIG. 1, the memory controller 110 may comprise a processing circuit such as a microprocessor 112, a storage unit such as a read-only memory (ROM) 112M, a control logic circuit 114, a completion time estimation (CTE) database 115, a RAM 116, and a transmission interface circuit 118, where the above components may be coupled to one another via a bus. The RAM 116 is implemented by a Static RAM (SRAM), but the present invention is not limited thereto. The CTE database 115 may comprise one or more types of time reference data, such as time reference data of various types of internal operations of the memory device 100, for performing CTE operations. The RAM 116 may be arranged to provide the memory controller 110 with internal storage space. For example, the RAM 116 may be utilized as a buffer memory for buffering data. In addition, the read-only memory 112M of this embodiment is arranged to store a program code 112C, and the microprocessor 112 is arranged to execute the program code 112C to control the access of the flash memory 120. Note that, in some examples, the program code 112C may be stored in the RAM 116 or any type of memory. Further, the control logic circuit 114 may be arranged to control the flash memory 120, and may comprise a data protection circuit (not shown) for protecting data and/or performing error correction, but the present invention is not limited thereto. The transmission interface circuit 118 may conform to a specific communications specification (e.g. Peripheral Component Interconnect Express (PCIe) specification), and may perform communications according to the specific communications specification, for example, perform communications with the host device 50 for the memory device 100, where the host device 50 may comprise the corresponding transmission interface circuit (e.g. PCIe transmission interface circuit), for performing communications with the memory device 100 for the host device 50.

In this embodiment, the host device 50 may transmit host commands and corresponding logical addresses to the memory controller 110 to access the memory device 100. The memory controller 110 receives the host commands and the logical addresses, and translates the host commands into memory operating commands (which may be simply referred to as operating commands), and further controls the NV memory 120 with the operating commands to perform reading, writing/programing, etc. on memory units (e.g. data pages) having physical addresses within the flash memory 120, where the physical addresses correspond to the logical addresses. When the memory controller 110 perform an erase operation on any NV memory element 122-n of the plurality of NV memory elements 122-1, 122-2, . . . , and 122-N (in which "n" may represent any integer in the interval [1, N]), at least one block of multiple blocks of the NV memory element 122-n may be erased, where each block of the blocks may comprise multiple pages (e.g. data pages), and an access operation (e.g. reading or writing) may be performed on one or more pages.

According to some embodiments, the architecture shown in FIG. 1 may vary. For example, the CTE database 115 may be integrated into the ROM 112M or into other memory within the memory device 100. For another example, the CTE database 115 may be implemented as a portion of program code running on the microprocessor 112. For another example, the CTE database 115 may be positioned in the NV memory 120.

Figure 2:
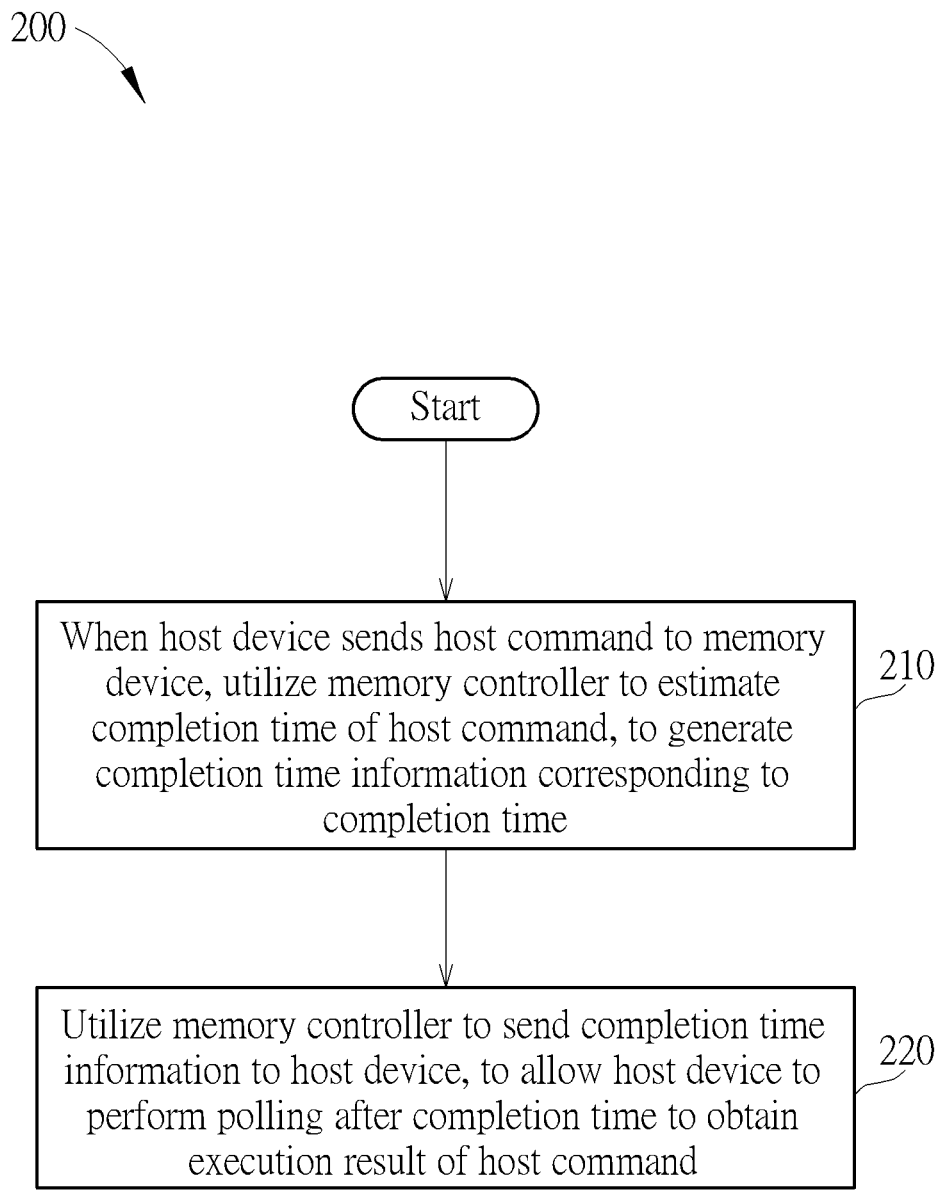
FIG. 2 is a working flow of a method for performing access management of a memory device according to an embodiment of the present invention.

FIG. 2 is a working flow 200 of a method for performing access management of a memory device according to an embodiment of the present invention. The method may be applied to the electronic device 10, the host device 50 and the processor 52 thereof, the memory device 100, and the memory controller 110 which may be arranged to control the accessing of the NV memory 120. For example, the host device 50 (e.g. a program running on the processor 52, such as a driver or an application) and the memory device 100 (e.g. the memory controller 110) may operate according to the method. Based on the method, each of the processor 52 and the memory controller 110 may perform access management of the memory device 100.

In Step 210, when the host device 50 sends a host command to the memory device 100, the host device 50 may utilize the memory controller 110 to estimate a completion time of the host command, to generate completion time information corresponding to the completion time. The processor 52 may control the host device 50 to send the host command to the memory device 100, and to utilize the memory controller 110 to estimate the completion time of the host command, to generate the completion time information corresponding to the completion time. Typically, the completion time may comprise a time period required for the memory device 100 to execute the host command to generate an execution result of the host command. According to this embodiment, the completion time may comprise time of one or more internal operations of the memory device 100, and the one or more internal operations may comprise accessing the NV memory 120 in response to the host command, but the present invention is not limited thereto. For example, the host command may comprise one of an erase request, a write request and a read request.

In Step 220, the host device 50 may utilize the memory controller 110 to send the completion time information to the host device 50 (e.g. register therein), to allow the host device 50 to perform polling after the completion time to obtain the execution result of the host command. According to the completion time information sent from the memory controller 110, the processor 52 may control the host device 50 to perform polling after the completion time to obtain the execution result of the host command. In this embodiment, during sending the host command to the memory device 100, for example, at a time point when sending the host command to the memory device 100, the host device 50 may operate in a user mode, rather than a kernel mode. After the host device 50 sends the host command to the memory device 100, the program running on the processor 52 (such as the driver or the application) may control the host device 50 to prevent continuously performing polling for the executing result until the completion time has expired, and more particularly, may control the host device 50 to perform at least one other operation (e.g. one or more other operations), rather than continuously performing polling for the executing result.

According to this embodiment, the host device 50 can perform the aforementioned at least one other operation before the completion time has expired, having no need to perform continuously polling. Therefore, the present invention method and apparatus can reach the goals of fully utilizing the transmission bandwidth between the host device 50 and the memory device 100 and obtaining the execution result (e.g. an access result) as soon as possible, without introducing the related art problems such as hardware resource full-load/overload (e.g. high usage such as 100%). In addition, as the host device 50 can perform the aforementioned at least one other operation before the completion time has expired, the present invention method and apparatus can guarantee optimal performance of the electronic device 10.

For better comprehension, the method may be illustrated with the working flow 200, but the present invention is not limited thereto. According to some embodiments, one or more steps may be added, deleted, or changed in the working flow 200.

According to some embodiments, under control of the memory controller 110, the memory device 100 may first complete a previous operation (if the previous operation exists), to be in a ready state for executing the host command. More particularly, the previous operation may be an operation that the memory device 100 is performing when receiving the host command, or a preparation operation making the memory device 100 be ready for executing the host command. Examples of the previous operation may include, but are not limited to: a Garbage Collection (GC) operation, an erase operation, a wear-leveling operation, and so on.

According to some embodiments, the host command may comprise a request. After the host device 10 has received the completion time information, the program running on the processor 52 (such as the driver or the application) may control the host device 50 to trigger the memory device 100 (e.g. the memory controller 110) to execute the request. More particularly, the request may represent an access request, such as one of the erase request, the write request and the read request. For example, when the request represents the write request, the execution result may represent the corresponding acknowledgement (ACK), and the write request may comprise data amount information, to allow the memory device 100 (e.g. the memory controller 110) to estimate the completion time according to the data amount information, where the data amount information may indicate a data amount of write data corresponding to the write request. For another example, when the request represents the read request, the execution result may represent the corresponding read data, and the host device 50 may send destination information to the memory device 100, to allow the memory device 100 (e.g. the memory controller 110) to store the execution result into a destination memory region in the memory 56 (e.g. RAM) of the host device 50 according to the destination information, where the destination information may indicate the destination memory region, and more particularly, may be a memory address of the destination memory region, but the present invention is not limited thereto. For yet another example, when the request represents the erase request, the execution result may represent the corresponding acknowledgement (ACK), and the erase request may comprise range information, to allow the memory device 100 (e.g. the memory controller 110) to estimate the completion time according to the range information, where the range information may indicate a range of address corresponding to the erase request (e.g. one or more logical block addresses (LBAs) corresponding to one or more blocks within the NV memory 120).

Figure 3:
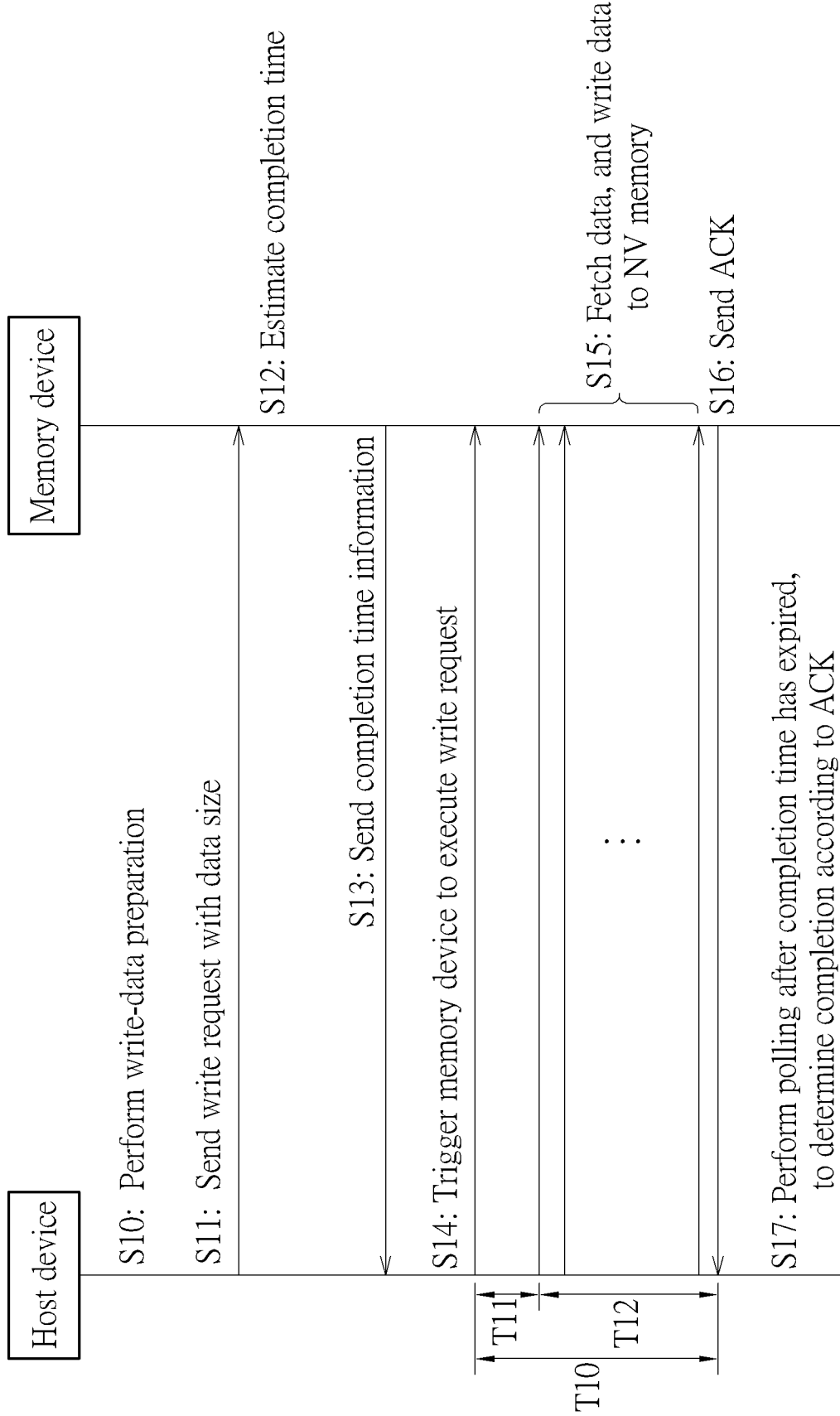
FIG. 3 illustrates a write control scheme of the method according to an embodiment of the present invention.

FIG. 3 illustrates a write control scheme of the method according to an embodiment of the present invention, where the host device 50 may perform operations under control of the program running on the processor 52 (such as the driver or the application), and the memory device 100 may perform operations under control of the memory controller 110.

In Step S10, the host device 50 (e.g. the program running on the processor 52, such as the driver or the application) may perform write-data preparation, for example, allocate a write buffer area in the memory 56 and move or copy the write data (e.g. the data to be written into the memory device 100) to the write buffer area.

In Step S11, the host device 50 (e.g. the program running on the processor 52, such as the driver or the application) may send the write request with the data size of the write data, where the data size can be taken as an example of the data amount information.

In Step S12, the memory device 100 (e.g. the memory controller 110) may estimate the completion time according to the data size. For example, in a situation where the NV memory 120 does not have sufficient space (e.g. a required number of blank blocks having overall space that is greater than the data size), the memory controller 110 may need to perform the previous operation such as a GC operation to prepare sufficient space for storing the write data. The memory controller 110 may determine the preparation time T11 of the GC operation according to time reference data of the GC operation (e.g. the speed or predetermined/historical time of generating blank blocks, such as time per block) within the CTE database 115 and the required number of blank blocks, and may determine the programming time T12 required for programming the write data into the NV memory 120 according to time reference data of the programming operation (e.g. the speed or predetermined/historical time of programming into blank blocks, such as time per block) within the CTE database 115 and the required number of blank blocks, and may further determine the completion time to be the summation (T11+T12) of the preparation time T11 and the programming time T12. For example, the completion time T10 of the write request may be expressed as follows:

$$T10=T11+T12.$$

In Step S13, the memory device 100 (e.g. the memory controller 110) may send the completion time information (e.g. the time information indicating the completion time T10). As a result, the host device 50 may obtain the completion time T10.

In Step S14, the host device 50 (e.g. the program running on the processor 52, such as the driver or the application) may trigger the memory device 100 (e.g. the memory controller 100) to execute the write request. More particularly, the host device 50 may prevent continuously performing polling for the executing result (e.g. the ACK corresponding to the write request) until the completion time T10 has expired. For example, before the completion time T10 has expired, the host device 50 may perform other operations without spending any time on polling for the executing result.

In Step S15, the memory device 100 (e.g. the memory controller 110) may fetch data (e.g. a portion of the write data in the write buffer area of the memory 56), and write the data to the NV memory 120. As a result, the memory controller 110 completes programming the write data into the NV memory 120.

In Step S16, the memory device 100 (e.g. the memory controller 110) may send the ACK corresponding to the write request to the host device 50.

In Step S17, the host device 50 (e.g. the program running on the processor 52, such as the driver or the application) may perform polling after the completion time has expired, to determine completion (e.g. the completion status of the write request) according to the ACK. Afterward, the host device 50 may release associated hardware resource such as the write buffer area mentioned above.

As the memory device 100 indeed stores all of the write data into the NV memory 120, rather than temporarily storing the write data in the RAM 116 and pretending that the work is done, the write data is safe for the electronic device 10. For example, in a situation where the electronic device 10 is implemented as an All-Flash Array (AFA) device comprising the host device 50 and multiple memory devices {100} (e.g. SSDs), the data of any of the memory devices {100} can be properly secured or protected and the error handling mechanism of the host device 50 can be robust. Therefore, the present invention can guarantee the overall performance of the electronic device 10.

According to some embodiments, suppose that the preparation operation does not exist, for example, the NV memory 120 has sufficient space, and the memory controller 110 does not need to perform the previous operation such as the GC operation. Therefore, the preparation time T11 shown in FIG. 3 may become zero, which means T10=T12.

Figure 4:
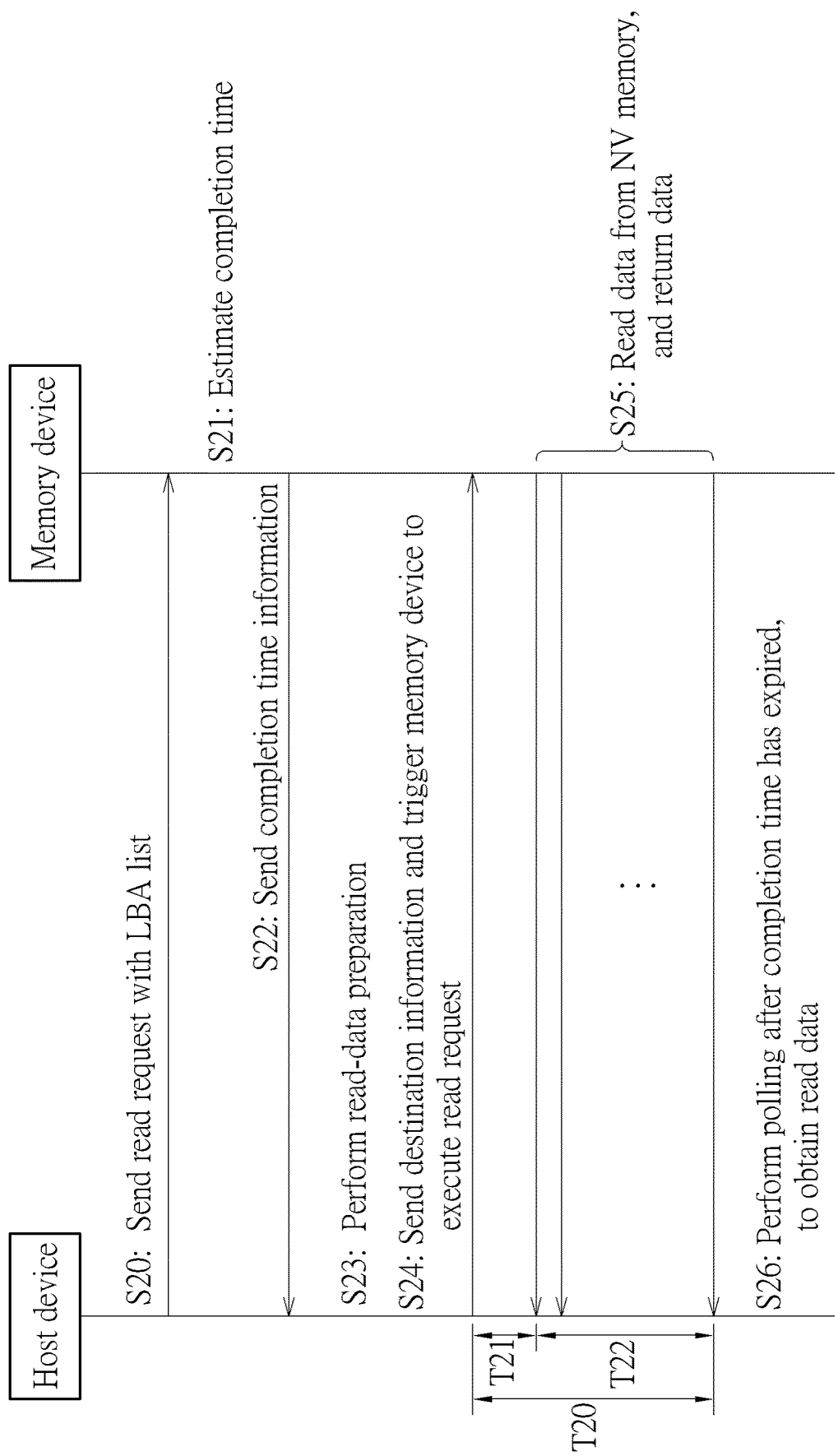
FIG. 4 illustrates a read control scheme of the method according to an embodiment of the present invention.

FIG. 4 illustrates a read control scheme of the method according to an embodiment of the present invention, where the host device 50 may perform operations under control of the program running on the processor 52 (such as the driver or the application), and the memory device 100 may perform operations under control of the memory controller 110.

In Step S20, the host device 50 (e.g. the program running on the processor 52, such as the driver or the application) may send the read request with a logical block address (LBA) list of the read data. For example, the LBA list may comprise at least one LBA (e.g. one or more LBAs) of the read data.

In Step S21, the memory device 100 (e.g. the memory controller 110) may estimate the completion time according to the LBA list. For example, in a situation where the memory controller 110 is performing the previous operation such as a specific internal operation (e.g. a GC operation, an erase operation, a wear-leveling operation, etc.) at the time of receiving the read request, the memory controller 110 may need the preparation time T21, for preparing to stop or suspend the specific internal operation, in order to prevent malfunction of the memory device 100. The memory controller 110 may determine the preparation time T21 according to time reference data of stopping or suspending the specific internal operation (e.g. the predetermined/historical time thereof) within the CTE database 115, and may determine the reading time T22 required for reading the read data from the NV memory 120 according to time reference data of the reading operation (e.g. the speed or predetermined/historical time of reading from data blocks, such as time per block) within the CTE database 115 and the number of blocks corresponding to the aforementioned at least one LBA, and may further determine the completion time to be the summation (T21+T22) of the preparation time T21 and the reading time T22. For example, the completion time T20 of the read request may be expressed as follows:

$$T20=T21+T22.$$

In Step S22, the memory device 100 (e.g. the memory controller 110) may send the completion time information (e.g. the time information indicating the completion time T20). As a result, the host device 50 may obtain the completion time T20.

In Step S23, the host device 50 (e.g. the program running on the processor 52, such as the driver or the application) may perform read-data preparation, for example, allocate a read buffer area in the memory 56 for storing the read data (e.g. the data to be read from the memory device 100), where the read buffer area can be taken as an example of the destination memory region.

In Step S24, the host device 50 (e.g. the program running on the processor 52, such as the driver or the application) may send the destination information (e.g. the memory address of the read buffer area) and trigger the memory device 100 (e.g. the memory controller 100) to execute the read request. More particularly, the host device 50 may prevent continuously performing polling for the executing result (e.g. the read data corresponding to the read request) until the completion time T20 has expired. For example, before the completion time T20 has expired, the host device 50 may perform other operations without spending any time on polling for the executing result.

In Step S25, the memory device 100 (e.g. the memory controller 110) may read data (e.g. a portion of the read data in the NV memory 120), and return the data to the read buffer area of the memory 56. As a result, the memory controller 110 completes reading the read data from the NV memory 120 and putting the read data into the read buffer area of the memory 56.

In Step S26, the host device 50 (e.g. the program running on the processor 52, such as the driver or the application) may perform polling after the completion time has expired, to obtain the read data. Afterward, the host device 50 may use the read data, and may release associated hardware resource such as the read buffer area when needed.

According to some embodiments, suppose that the preparation operation does not exist, for example, the memory controller 110 is not performing the previous operation such as the specific internal operation at the time of receiving the read request. Therefore, the preparation time T21 shown in FIG. 4 may become zero, which means T20=T22.

Figure 5:
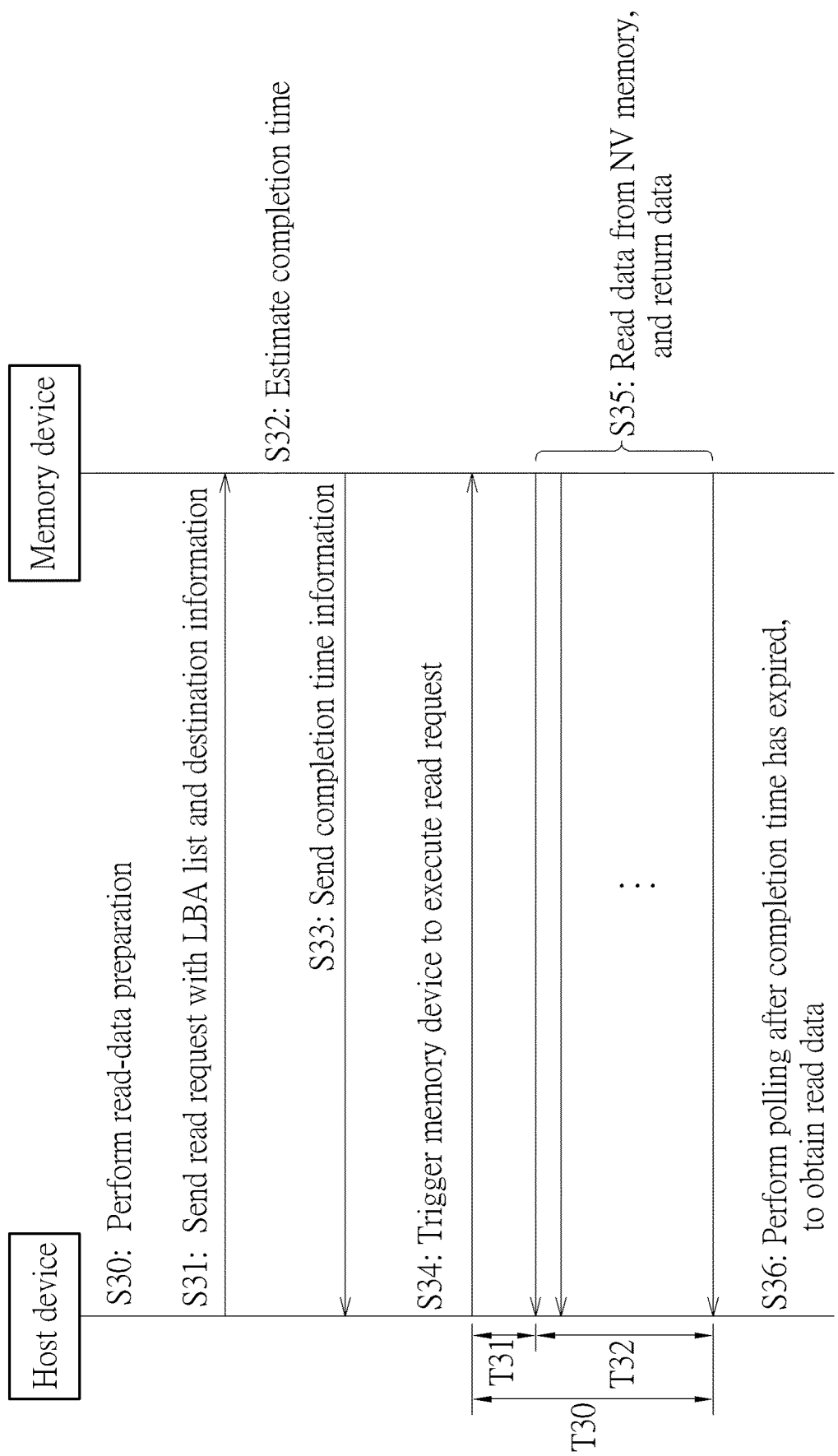
FIG. 5 illustrates a read control scheme of the method according to another embodiment of the present invention.

FIG. 5 illustrates a read control scheme of the method according to another embodiment of the present invention, where the host device 50 may perform operations under control of the program running on the processor 52 (such as the driver or the application), and the memory device 100 may perform operations under control of the memory controller 110.

In Step S30, the host device 50 (e.g. the program running on the processor 52, such as the driver or the application) may perform read-data preparation, for example, allocate a read buffer area in the memory 56 for storing the read data (e.g. the data to be read from the memory device 100), where the read buffer area can be taken as an example of the destination memory region.

In Step S31, the host device 50 (e.g. the program running on the processor 52, such as the driver or the application) may send the read request with a logical block address (LBA) list of the read data and the destination information (e.g. the memory address of the read buffer area). For example, the LBA list may comprise at least one LBA (e.g. one or more LBAs) of the read data.

In Step S32, the memory device 100 (e.g. the memory controller 110) may estimate the completion time according to the LBA list. For example, in a situation where the memory controller 110 is performing the previous operation such as a specific internal operation (e.g. a GC operation, an erase operation, a wear-leveling operation, etc.) at the time of receiving the read request, the memory controller 110 may need the preparation time T31, for preparing to stop or suspend the specific internal operation, in order to prevent malfunction of the memory device 100. The memory controller 110 may determine the preparation time T31 according to time reference data of stopping or suspending the specific internal operation (e.g. the predetermined/historical time thereof) within the CTE database 115, and may determine the reading time T32 required for reading the read data from the NV memory 120 according to time reference data of the reading operation (e.g. the speed or predetermined/historical time of reading from data blocks, such as time per block) within the CTE database 115 and the number of blocks corresponding to the aforementioned at least one LBA, and may further determine the completion time to be the summation (T31+T32) of the preparation time T31 and the reading time T32. For example, the completion time T30 of the read request may be expressed as follows:

$$T30=T31+T32.$$

In Step S33, the memory device 100 (e.g. the memory controller 110) may send the completion time information (e.g. the time information indicating the completion time T30). As a result, the host device 50 may obtain the completion time T30.

In Step S34, the host device 50 (e.g. the program running on the processor 52, such as the driver or the application) may trigger the memory device 100 (e.g. the memory controller 100) to execute the read request. More particularly, the host device 50 may prevent continuously performing polling for the executing result (e.g. the read data corresponding to the read request) until the completion time T30 has expired. For example, before the completion time T30 has expired, the host device 50 may perform other operations without spending any time on polling for the executing result.

In Step S35, the memory device 100 (e.g. the memory controller 110) may read data (e.g. a portion of the read data in the NV memory 120), and return the data to the read buffer area of the memory 56. As a result, the memory controller 110 completes reading the read data from the NV memory 120 and putting the read data into the read buffer area of the memory 56.

In Step S36, the host device 50 (e.g. the program running on the processor 52, such as the driver or the application) may perform polling after the completion time has expired, to obtain the read data. Afterward, the host device 50 may use the read data, and may release associated hardware resource such as the read buffer area when needed.

According to some embodiments, suppose that the preparation operation does not exist, for example, the memory controller 110 is not performing the previous operation such as the specific internal operation at the time of receiving the read request. Therefore, the preparation time T31 shown in FIG. 5 may become zero, which means T30=T32.

Figure 6:
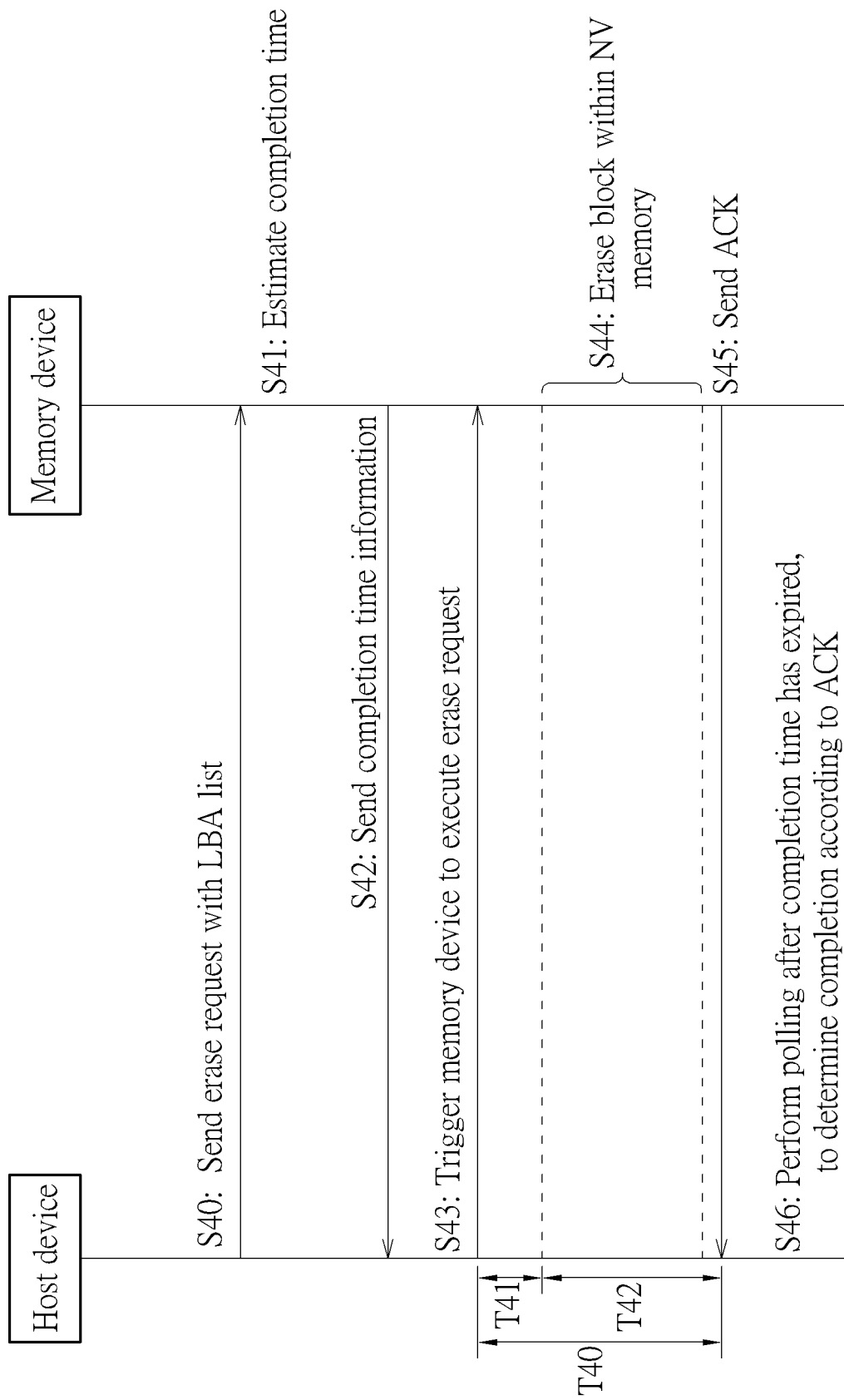
FIG. 6 illustrates an erase control scheme of the method according to an embodiment of the present invention.

FIG. 6 illustrates an erase control scheme of the method according to an embodiment of the present invention, where the host device 50 may perform operations under control of the program running on the processor 52 (such as the driver or the application), and the memory device 100 may perform operations under control of the memory controller 110.

In Step S40, the host device 50 (e.g. the program running on the processor 52, such as the driver or the application) may send the erase request with a logical block address (LBA) list, where the LBA list can be taken as an example of the range information. According to this embodiment, the LBA list may comprise at least one LBA (e.g. one or more LBAs) corresponding to at least one block (e.g. one or more blocks) within the NV memory 120.

In Step S41, the memory device 100 (e.g. the memory controller 110) may estimate the completion time according to the LBA list. For example, in a situation where the memory controller 110 is performing the previous operation such as a specific internal operation (e.g. a GC operation, an erase operation, a wear-leveling operation, etc.) at the time of receiving the erase request, the memory controller 110 may need the preparation time T41, for preparing to stop or suspend the specific internal operation, in order to prevent malfunction of the memory device 100. The memory controller 110 may determine the preparation time T41 according to time reference data of stopping or suspending the specific internal operation (e.g. the predetermined/historical time thereof) within the CTE database 115, and may determine the erasing time T42 required for erasing the aforementioned at least one block (e.g. the one or more blocks) within the NV memory 120 according to time reference data of the erasing operation (e.g. the speed or predetermined/historical time of erasing blocks, such as time per block) within the CTE database 115 and the number of blocks corresponding to the aforementioned at least one LBA (e.g. the one or more LBAs) within the LBA list mentioned in Step S40, and may further determine the completion time to be the summation (T41+T42) of the preparation time T41 and the erasing time T42. For example, the completion time T40 of the erase request may be expressed as follows:

$$T40=T41+T42.$$

In Step S42, the memory device 100 (e.g. the memory controller 110) may send the completion time information (e.g. the time information indicating the completion time T40). As a result, the host device 50 may obtain the completion time T40.

In Step S43, the host device 50 (e.g. the program running on the processor 52, such as the driver or the application) may trigger the memory device 100 (e.g. the memory controller 100) to execute the erase request. More particularly, the host device 50 may prevent continuously performing polling for the executing result (e.g. the ACK corresponding to the erase request) until the completion time T40 has expired. For example, before the completion time T40 has expired, the host device 50 may perform other operations without spending any time on polling for the executing result.

In Step S44, the memory device 100 (e.g. the memory controller 110) may erase the aforementioned at least one block (e.g. the one or more blocks) within the NV memory 120. As a result, the memory controller 110 completes erasing the aforementioned at least one block (e.g. the one or more blocks) within the NV memory 120.

In Step S45, the memory device 100 (e.g. the memory controller 110) may send the ACK corresponding to the erase request to the host device 50.

In Step S46, the host device 50 (e.g. the program running on the processor 52, such as the driver or the application) may perform polling after the completion time has expired, to determine completion (e.g. the completion status of the erase request) according to the ACK. Afterward, the host device 50 may use the block(s) for some purposes when there is a need.

According to some embodiments, suppose that the preparation operation does not exist, for example, the memory controller 110 is not performing the previous operation such as the specific internal operation at the time of receiving the erase request. Therefore, the preparation time T41 shown in FIG. 6 may become zero, which means T40=T42.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for performing access management of a memory device, the memory device comprising a non-volatile (NV) memory and a memory controller for controlling the accessing of the NV memory, the NV memory comprising at least one NV memory element, the method comprising:

if a host device sends a host command to the memory device, utilizing the memory controller to estimate a completion time of the host command, to generate completion time information corresponding to the completion time; and utilizing the memory controller to send the completion time information to the host device, to allow the host device to, based on time management starting from a trigger time point at which the host device triggers the memory controller to start executing the host command, perform polling after the completion time to obtain an execution result of the host command, wherein the memory controller is configured to, when receiving the host command, wait for starting executing the host command until the trigger time point, to make the time management starting from the trigger time point correspond to the completion time that is estimated by the memory controller, an operation of triggering the memory controller to start executing the host command is applicable to each of multiple cases of the accessing of the NV memory, and the multiple cases of the accessing of the NV memory comprise reading the NV memory, writing the NV memory, and erasing the NV memory.

2. The method of claim 1, wherein the completion time comprises a time period required for the memory device to execute the host command to generate the execution result.

3. The method of claim 1, wherein the completion time comprises time of one or more internal operations of the memory device, and the one or more internal operations comprises accessing the NV memory in response to the host command.

4. The method of claim 3, wherein the memory device first completes a previous operation, if exists, to be in a ready state for executing the host command.

5. The method of claim 1, wherein the memory controller is configured to wait for starting executing the host command during a time interval between two time points comprising the trigger time point and a command-reception time point at which the memory controller receives the host command, the trigger time point being different from the command-reception time point and being posterior to the command-reception time point.

6. The method of claim 1, wherein during sending the host command to the memory device, the host device operates in a user mode, rather than a kernel mode.

7. The method of claim 1, further comprising:
after the host device sends the host command to the memory device, controlling the host device to prevent continuously performing polling for the executing result until the completion time has expired.

8. The method of claim 7, wherein controlling the host device to prevent continuously performing polling for the executing result comprises:
controlling the host device to perform at least one other operation, rather than continuously performing polling for the executing result.

9. The method of claim 1, wherein the host command comprises a request;
and the method further comprises:
after the host device has received the completion time information, controlling the host device to trigger the memory device to execute the request.

10. The method of claim 9, wherein the request represents an access request, and the access request is one of an erase request, a write request and a read request.

11. The method of claim 9, wherein the request represents a write request, the execution result represents corresponding acknowledgement, and the write request comprises data amount information, to allow the memory controller to estimate the completion time according to the data amount information, wherein the data amount information indicates a data amount of write data corresponding to the write request.

12. The method of claim 9, wherein the request represents a read request, the execution result represents corresponding read data, and the host device sends destination information to the memory device, to allow the memory device to store the execution result into a destination memory region in a memory of the host device according to the destination information, wherein the destination information indicates the destination memory region.

13. The method of claim 9, wherein the request represents an erase request, the execution result represents corresponding acknowledgement, and the erase request comprises range information, to allow the memory controller to estimate the completion time according to the range information, wherein the range information indicates a range of address corresponding to the erase request.

14. A memory device, comprising:
a non-volatile (NV) memory, arranged to store information, wherein the NV memory comprises at least one NV memory element; and
a controller, coupled to the NV memory, arranged to control operations of the memory device, wherein the controller comprises:
a processing circuit, arranged to control the controller according to a plurality of host commands from a host device, to allow the host device to access the NV memory through the controller, wherein:
if the host device sends a host command to the memory device, the controller estimates a completion time of the host command, to generate completion time information corresponding to the completion time; and
the controller sends the completion time information to the host device, to allow the host device to, based on time management starting from a trigger time point at which the host device triggers the controller to start executing the host command, perform polling after the completion time to obtain an execution result of the host command, wherein the controller is configured to, when receiving the host command, wait for starting executing the host command until the trigger time point, to make the time management starting from the trigger time point correspond to the completion time that is estimated by the controller, an operation of triggering the controller to start executing the host command is applicable to each of multiple cases of the accessing of the NV memory, and the multiple cases of the accessing of the NV memory comprise reading the NV memory, writing the NV memory, and erasing the NV memory.

15. The memory device of claim 14, wherein the completion time comprises a time period required for the memory device to execute the host command to generate the execution result.

16. The memory device of claim 14, wherein the completion time comprises time of one or more internal operations of the memory device, and the one or more internal operations comprises accessing the NV memory in response to the host command.

17. The memory device of claim 16, wherein the memory device first completes a previous operation, if exists, to be in a ready state for executing the host command.

18. The memory device of claim 14, wherein the controller is configured to wait for starting executing the host command during a time interval between two time points comprising the trigger time point and a command-reception time point at which the controller receives the host command, the trigger time point being different from the command-reception time point and being posterior to the command-reception time point.

19. An electronic device comprising the memory device of claim 14, and further comprising:
the host device, coupled to the memory device, wherein the host device comprises:
at least one processor, arranged for controlling operations of the host device; and
a power supply circuit, coupled to the at least one processor, arranged for providing power to the at least one processor and the memory device;
wherein the memory device provides the host device with storage space.

20. A controller of a memory device, the memory device comprising the controller and a non-volatile (NV) memory, the NV memory comprising at least one NV memory element, the controller comprising:
a processing circuit, arranged to control the controller according to a plurality of host commands from a host device, to allow the host device to access the NV memory through the controller, wherein:
if the host device sends a host command to the memory device, the controller estimates a completion time of the host command, to generate completion time information corresponding to the completion time; and
the controller sends the completion time information to the host device, to allow the host device to, based on time management starting from a trigger time point at which the host device triggers the controller to start executing the host command, perform polling after the completion time to obtain an execution result of the host command, wherein the controller is configured to, when receiving the host command, wait for starting executing the host command until the trigger time point, to make the time management starting from the trigger time point correspond to the completion time that is estimated by the controller, an operation of triggering the controller to start executing the host command is applicable to each of multiple cases of the accessing of the NV memory, and the multiple cases of the accessing of the NV memory comprise reading the NV memory, writing the NV memory, and erasing the NV memory.

21. A method for performing access management of a memory device, the memory device comprising a non-volatile (NV) memory and a memory controller for controlling the accessing of the NV memory, the NV memory comprising at least one NV memory element, the method comprising:
controlling a host device to send a host command to the memory device, and to utilize the memory controller to estimate a completion time of the host command, to generate completion time information corresponding to the completion time; and
according to the completion time information sent from the memory controller, controlling the host device to, based on time management starting from a trigger time point at which the host device triggers the memory controller to start executing the host command, perform polling after the completion time to obtain an execution result of the host command, wherein the memory controller is configured to, when receiving the host command, wait for starting executing the host command until the trigger time point, to make the time management starting from the trigger time point correspond to the completion time that is estimated by the memory controller, an operation of triggering the memory controller to start executing the host command is applicable to each of multiple cases of the accessing of the NV memory, and the multiple cases of the accessing of the NV memory comprise reading the NV memory, writing the NV memory, and erasing the NV memory.

22. The method of claim 21, wherein the completion time comprises a time period required for the memory device to execute the host command to generate the execution result.

23. The method of claim 21, wherein the completion time comprises time of one or more internal operations of the memory device, and the one or more internal operations comprises accessing the NV memory in response to the host command.

24. The method of claim 23, wherein the memory device first completes a previous operation, if exists, to be in a ready state for executing the host command.

25. The method of claim 21, wherein the memory controller is configured to wait for starting executing the host command during a time interval between two time points comprising the trigger time point and a command-reception time point at which the memory controller receives the host command, the trigger time point being different from the command-reception time point and being posterior to the command-reception time point.

26. The method of claim 21, wherein during sending the host command to the memory device, the host device operates in a user mode, rather than a kernel mode.

27. The method of claim 21, further comprising:
after the host device sends the host command to the memory device, controlling the host device to prevent continuously performing polling for the executing result until the completion time has expired.

28. The method of claim 27, wherein controlling the host device to prevent continuously performing polling for the executing result comprises:
controlling the host device to perform at least one other operation, rather than continuously performing polling for the executing result.

29. The method of claim 21, wherein the host command comprises a request; and the method further comprises:
after the host device has received the completion time information, controlling the host device to trigger the memory device to execute the request.

30. The method of claim 29, wherein the request represents an access request, and the access request is one of an erase request, a write request and a read request.

31. The method of claim 29, wherein the request represents a write request, the execution result represents corresponding acknowledgement, and the write request comprises data amount information, to allow the memory controller to estimate the completion time according to the data amount information, wherein the data amount information indicates a data amount of write data corresponding to the write request.

32. The method of claim 29, wherein the request represents a read request, the execution result represents corresponding read data, and the host device sends destination information to the memory device, to allow the memory device to store the execution result into a destination memory region in a memory of the host device according to the destination information, wherein the destination information indicates the destination memory region.

33. The method of claim 29, wherein the request represents an erase request, the execution result represents corresponding acknowledgement, and the erase request comprises range information, to allow the memory controller to estimate the completion time according to the range information, wherein the range information indicates a range of address corresponding to the erase request.

34. A host device, comprising:
  at least one processor, arranged to control operations of the host device, and perform access management of a memory device, wherein the memory device comprises a non-volatile (NV) memory and a memory controller for controlling the accessing of the NV memory, and the NV memory comprises at least one NV memory element;
  wherein said at least one processor controls the host device to send a host command to the memory device, and to utilize the memory controller to estimate a completion time of the host command, to generate completion time information corresponding to the completion time; and
  according to the completion time information sent from the memory controller, said at least one processor controls the host device to, based on time management starting from a trigger time point at which the host device triggers the memory controller to start executing the host command, perform polling after the completion time to obtain an execution result of the host command, wherein the memory controller is configured to, when receiving the host command, wait for starting executing the host command until the trigger time point, to make the time management starting from the trigger time point correspond to the completion time that is estimated by the memory controller, an operation of triggering the memory controller to start executing the host command is applicable to each of multiple cases of the accessing of the NV memory, and the multiple cases of the accessing of the NV memory comprise reading the NV memory, writing the NV memory, and erasing the NV memory.

35. The host device of claim 34, wherein the completion time comprises a time period required for the memory device to execute the host command to generate the execution result.

36. The host device of claim 34, wherein the completion time comprises time of one or more internal operations of the memory device, and the one or more internal operations comprises accessing the NV memory in response to the host command.

37. The host device of claim 36, wherein the memory device first completes a previous operation, if exists, to be in a ready state for executing the host command.

38. The host device of claim 34, wherein the memory controller is configured to wait for starting executing the host command during a time interval between two time points comprising the trigger time point and a command-reception time point at which the memory controller receives the host command, the trigger time point being different from the command-reception time point and being posterior to the command-reception time point.

39. The host device of claim 34, further comprising:
  a power supply circuit, coupled to the at least one processor, arranged to provide power to the at least one processor and the memory device;
  wherein the memory device provides the host device with storage space.

* * * * *